United States Patent
Hasegawa

(10) Patent No.: US 8,634,863 B2
(45) Date of Patent: Jan. 21, 2014

(54) MOBILE TERMINAL DEVICE AND DATA TRANSFER CONTROL PROGRAM

(75) Inventor: Motoyoshi Hasegawa, Saitama (JP)

(73) Assignee: NEC Corporation, Tokyo (JP)

( * ) Notice: Subject to any disclaimer, the term of this patent is extended or adjusted under 35 U.S.C. 154(b) by 494 days.

(21) Appl. No.: 12/374,942

(22) PCT Filed: Jul. 2, 2007

(86) PCT No.: PCT/JP2007/063614
§ 371 (c)(1),
(2), (4) Date: Jan. 23, 2009

(87) PCT Pub. No.: WO2008/013044
PCT Pub. Date: Jan. 31, 2008

(65) Prior Publication Data
US 2010/0009667 A1    Jan. 14, 2010

(30) Foreign Application Priority Data
Jul. 26, 2006    (JP) .................................. 2006-203633

(51) Int. Cl.
*H04W 4/00*    (2009.01)

(52) U.S. Cl.
USPC ..... 455/466; 455/418; 455/414.1; 455/426.1; 370/328; 345/158; 345/159; 700/13; 700/56; 700/69

(58) Field of Classification Search
USPC .............. 705/71; 455/414.1, 466, 418, 426.1; 345/158, 1.1, 159; 700/13, 56, 69; 370/328–338
See application file for complete search history.

(56) References Cited

U.S. PATENT DOCUMENTS

| | | | | |
|---|---|---|---|---|
| 4,675,820 A | * | 6/1987 | Smith et al. | 701/501 |
| 5,554,980 A | * | 9/1996 | Hashimoto et al. | 345/158 |
| 6,369,794 B1 | * | 4/2002 | Sakurai et al. | 345/156 |
| 2002/0140625 A1 | * | 10/2002 | Kidney et al. | 345/1.1 |

(Continued)

FOREIGN PATENT DOCUMENTS

| | | |
|---|---|---|
| JP | 1999075240 A | 3/1999 |
| JP | 2001331281 A | 11/2001 |

(Continued)

OTHER PUBLICATIONS

International Search Report for PCT/JP2007/063614 mailed Sep. 18, 2007.

(Continued)

*Primary Examiner* — Mahendra Patel
*Assistant Examiner* — Quan M Hua

(57) ABSTRACT

There are obtained a mobile terminal device and a data transfer control program that, even in the case where a plurality of data that become a target of transfer exist, can simply carry out an operation to select data to be transferred from them and to start transfer itself without a mistake. An acceleration sensor 118 fixedly provided in the device is activated at a state where the data to be transferred are displayed on a first liquid crystal display 104 and selected by an operation section 112. A control section 121 starts the transfer of the data using an infrared communication section 105 at the time when to become a posture of a specific angle range continuously more than once. Since a predetermined melody comes out from a speaker 110 during the transfer of the data, it is possible to know that the transfer is carried out.

9 Claims, 8 Drawing Sheets

(56) References Cited

U.S. PATENT DOCUMENTS

| | | | |
|---|---|---|---|
| 2005/0219211 A1* | 10/2005 | Kotzin et al. | 345/158 |
| 2006/0185432 A1* | 8/2006 | Weinberg | 73/510 |
| 2007/0233612 A1* | 10/2007 | Barrus et al. | 705/71 |
| 2007/0255853 A1* | 11/2007 | Toutonghi | 709/246 |
| 2008/0174550 A1* | 7/2008 | Laurila et al. | 345/158 |

FOREIGN PATENT DOCUMENTS

| | | | |
|---|---|---|---|
| JP | 2002199443 A | 7/2002 |
| JP | 2002358193 A | 12/2002 |
| JP | 2005284657 A | 10/2005 |
| JP | 2006109493 A | 4/2006 |
| JP | 2006166274 A | 6/2006 |
| JP | 2006209252 A | 8/2006 |
| JP | 2006254241 A | 9/2006 |
| JP | 2007201787 A | 8/2007 |
| WO | 2005103860 A | 11/2005 |
| WO | 2006068115 A | 6/2006 |

OTHER PUBLICATIONS

Japanese Office Action for JP2006-203633 mailed Feb. 22, 2011.

\* cited by examiner

- INCLINATION IN X-AXIS DIRECTION (0 TO 359 )
- INCLINATION IN Y-AXIS DIRECTION (0 TO 359 )

[yaw]

MOBILE TERMINAL DEVICE AND DATA TRANSFER CONTROL PROGRAM

This application is the National Phase of PCT/JP2007/063614, filed Jul. 2, 2007, which claims priority to Japanese Patent Application No. 2006-203633, filed on Jul. 26, 2006, the disclosure of which is incorporated herein in its entirety by reference.

TECHNICAL FIELD

The present invention relates to a mobile terminal device and a data transfer control program capable of carrying out transfer of data using communication means such as infrared communication, and particularly, the present invention relates to a mobile terminal device and a data transfer control program having a feature in start of transfer of data.

BACKGROUND ART

Mobile terminal devices such as a cellular phone, a PHS (Personal Handy-phone System) and a PDA (Personal Digital Assistant) provided with a communication function are widely utilized as a device to which various functions are added in addition to communication. In such a device, products on each of which a GPS (Global Positioning System) function is mounted increase, and they are used for a navigation system for carrying out navigation by displaying a map. In such a navigation system, by using an acceleration sensor together in the mobile terminal device on which the GPS function is mounted, intuitive navigation coupled to a walking action becomes possible. In addition, the GPS can demonstrate a great deal of power in difficult navigation at an underground shopping area or within doors.

Moreover, a first proposal for using protection of data when a mobile terminal device falls down by utilizing an acceleration sensor to determine time to start transfer of the data has been made (see Japanese Patent Application Publication No. 2001-331281, Paragraphs 0033 to 0035, and FIG. 1, for example). In this first proposal, it is adapted so that, in the case where the mobile terminal device starts free fall due to any cause, the acceleration sensor detects this at an early stage, and data stored in a memory are transferred to a backup server before the device collides with the ground to be damaged. In the case where a mobile terminal device falls from a height of about one meter, it is well possible to detect the falling, to start communication with the backup server, and to transfer the data to the backup server in the interval because there is time of about 450 milliseconds before collision against the ground.

It has been proposed as a second proposal (see Japanese Patent Application Publication No. 2005-284657, Paragraphs 0004 and 0024, and FIG. 6, for example) to use an acceleration sensor mounted on a cellular phone for data transfer other than such data transfer in an emergency. This second proposal is one for solving a problem that, when a user is caused to read the content of a file within a mobile information terminal, it may be hardly viewed because a display section provided in the device is small in relation to a size. It uses the mobile information terminal itself as an input device such as a mouse. The acceleration sensor is provided in the input device, and this determines whether or not to be a predetermined posture. In the case where it is determined to be the predetermined posture, information stored in storage means is to be transferred to other device.

DISCLOSURE OF THE INVENTION

Problems to be solved by the Invention

In the second proposal, the device itself that transfers data to other device is not provided with a display section. Although the specification of the second proposal does not clearly demonstrate what such a device is, for example, it is guessed that it is one like a simple camera having no display section. In the case of the simple camera, when a user shoots one piece of photograph, an acceleration sensor embedded therein is caused to detect by causing this device to be a predetermined posture, and image data are to be transferred to other device such as a personal computer.

Therefore, according to the second proposal, it is possible to carry out transfer of data such as image data easily, but there is need that the data to become a target of the transfer are only ones that have already been determined. The user cannot select desired data from a plurality of data to transmit them.

For this reason, heretofore, some data to become a target of transfer have been displayed on a display of the mobile terminal device, data to be transferred this time have been specified from them by operating operation keys, and a "transmit" button for start of data transfer has further been pushed at the timing to transmit them. However, since the display occupies a relatively large area, the number of buttons arranged on the mobile terminal device is limited, and the "transmit" button is not always a dedicated button. Therefore, other button may be pushed erroneously and mistakenly, and it may fail to transfer data. Further, even in the case where a dedicated button is arranged, an arrangement space for the whole buttons may not be sufficient. Therefore, the "transmit" button is often arranged so as to approach other buttons, and the size is normally small. Thus, if the user does not operate the mobile terminal device in resting state carefully, wrong entry may have occurred.

It is therefore an object of the present invention to provide a mobile terminal device and a data transfer control program that, even in the case where there are a plurality of data to become a target of transfer, can select data to be transferred from them and further carry out start of the transfer by an operation easily without a mistake.

Means for Solving the Problems

In the invention defined in claim 1, (a) postural change detecting means for detecting a specific change on a posture of an apparatus body; (b) a display for displaying visual information; (c) transferred data candidate display means for displaying candidates of data to be transferred on the display; (d) transferred data selecting means for selecting data to be transferred from the candidates displayed by the transferred data candidate display means; and (e) data transfer starting means for starting transfer of the data when the postural change detecting means detects the specific change in a state where the data to be transferred are selected by the transferred data selecting means are included in a mobile terminal device.

Namely, in the present invention, the mobile terminal device is caused to include the display in addition to the postural change detecting means and to display and select candidates of the data to be transferred using the display. When the postural change detecting means carries out the specific change at a state where the data to be transferred are selected, transfer of the data is started. This makes it possible to carry out an important operation that is the transfer of the data after selection surely and easily.

It is possible to easily confirm the state where the transfer of the data is carried out by outputting a notification sound for notifying this. When the transfer of the data is terminated, a completion notification sound for notifying this may be outputted. Further, displaying the state of the data transfer on the display may be used together. Moreover, in order to prevent a false operation of an instruction to start transfer of the data, it is effective to start the transfer of the data, provided that the change presence/absence determining means for determining presence or absence of the specific change detects presence of the change continuously more than once.

In a data transfer control program of the invention defined in claim 8, a computer is caused to execute: (a) a transferred data selecting process for selecting data to be transferred; (b) a sampling process for sampling, after the data to be transferred are selected in the transferred data selecting process, an angle by which a posture of an apparatus body is displaced from a reference position from an output of an acceleration sensor fixed in the apparatus body every predetermined period of time; (c) a specific angle range continuously detecting process for detecting this when the angle enters a specific angle range more than once by the sampling process; (d) a data transfer starting process for starting transfer of the data selected in the transferred data selecting process when it is detected that the angle continuously enters the specific angle range more than once in the specific angle range continuously detecting process; and (e) a notification sound outputting process for outputting a notification sound until the transfer of the data is terminated when the transfer of the data is started in the data transfer starting process, the notification sound indicating that the transfer of the data is being carried out.

Namely, in the present invention, the data transfer control program executed by the computer causes it to select the data to be transferred in the transferred data selecting process, and to sample an angle at which a posture of the apparatus body is displaced from a reference position from an output of an acceleration sensor fixed in the apparatus body for a predetermined period of time in the sampling process. When it is detected continuously more than once that it enters the specific angle range, the transfer of the data is started in the data transfer starting process. This makes it possible to prevent a false operation that the data are transferred in the case where a posture of the mobile terminal device is changed due to other cause. Further, since the notification sound is outputted during the transfer of the data by carrying out the notification sound outputting process, it is possible to confirm with a sound that the data are transferred.

Effects of the Invention

As explained above, according to the present invention, by focusing that a lot of mobile terminal devices are provided with a display, selection of data to be transferred and start of transmission are respectively shared with the display and the acceleration sensor. Therefore, it is possible to carry out the transfer of the data surely and easily. In addition, if a motion to incline the mobile terminal device is associated with a specific change with respect to the posture, an image is common to an action to send out data. Therefore, the operation can be memorized as an intuitive operation, and a start operation of data transfer can be carried out without a mistake. Further, if the state such as transfer of data is notified with a sound, it is possible to grasp the state without the need to view the display.

BEST MODE FOR CARRYING OUT THE INVENTION

Hereinafter, embodiments of the present invention will be described with reference to the drawings.

(Embodiment 1)

Figure 1:
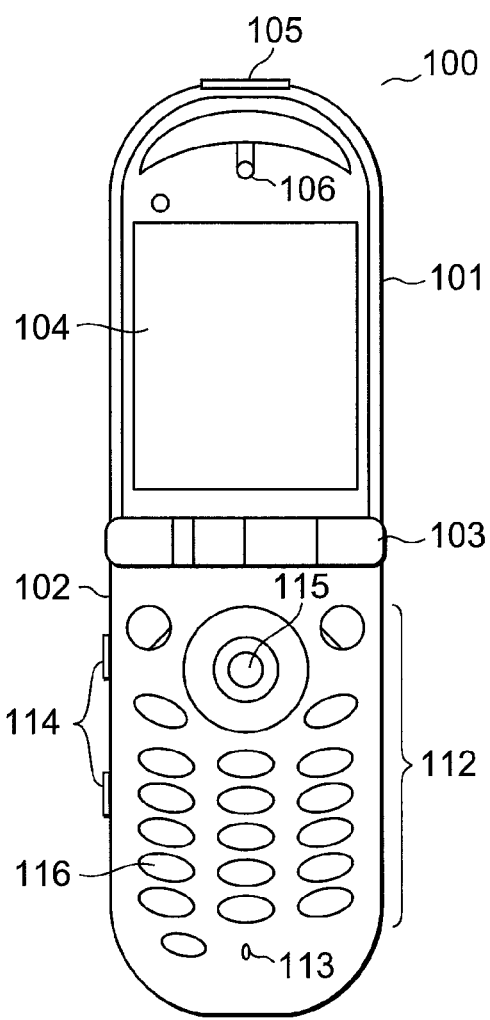
FIG. 1 is a front view showing an opened state of a flip cellular phone according to an embodiment of the present invention.
Figure 2:
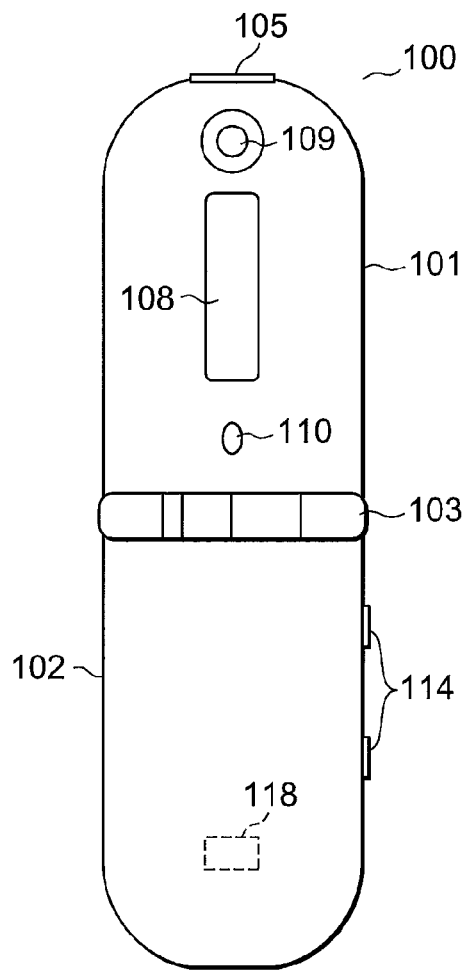
FIG. 2 is a back view showing the opened state of the flip cellular phone according to the present embodiment.

FIG. 1 is a view when a state where a flip cellular phone as a mobile terminal device according to the present invention is opened is viewed from a front surface, and FIG. 2 is a view when this cellular phone is viewed from a back surface. A cellular phone 100 according to the present embodiment has a structure in which a first enclosure 101 and a second enclosure 102 can be opened and closed by means of a hinge mechanism 103.

As shown in FIG. 1, in the center of a front surface of the first enclosure 101, a large-sized first liquid crystal display 104 is arranged, and in a top portion thereof, an infrared communication section 105 is arranged. The infrared communication section 105 is adapted to transmit and receive data such as e-mail, phone book data or schedules with infrared rays. In a middle position between the liquid crystal display 104 and the infrared communication section 105, a receiver 106 used as a telephone receiver at a telephone call is arranged.

Further, as shown in FIG. 2, in the center of a back surface of the first enclosure 101, a small-sized second liquid crystal display 108 is arranged, and in the upper and lower sides thereof, a camera 109 for shooting a still image and a video and a speaker 110 for outputting a ringing tone and various warnings with sound are respectively arranged. The cellular phone 100 has a function to carry out reading of a bar code using an image shot by the camera 109. The first liquid crystal display 104 carries out various kinds of displays such as a display of a phone number, current time, within a service area or without a service area, a display of a phone book and a schedule, a display of a calendar, a display of a function menu, and a display of a mode set currently. The second liquid crystal display 108 carries out displays of information necessary or convenient in a state where the cellular phone 100 is folded, of these displays.

On a front surface side of the second enclosure 102 of the cellular phone 100, as shown in FIG. 1, an operation section 112 and a microphone 113 used as a telephone transmitter at a telephone call are arranged. The operation section 112 is constructed from switches and the like, such as side keys 114 arranged on a side portion of the second enclosure 102, a pointer 115 provided at the lower side of the hinge mechanism 103 on the front surface, and dial keys 116 provided at the lower side thereof. In a back surface side of the second enclosure 102, as shown in FIG. 2, an acceleration sensor 118 is embedded. The acceleration sensor 118 detects acceleration in an X axis direction and a Y axis direction as will be explained later to output posture information of the cellular phone 100.

Figure 3:
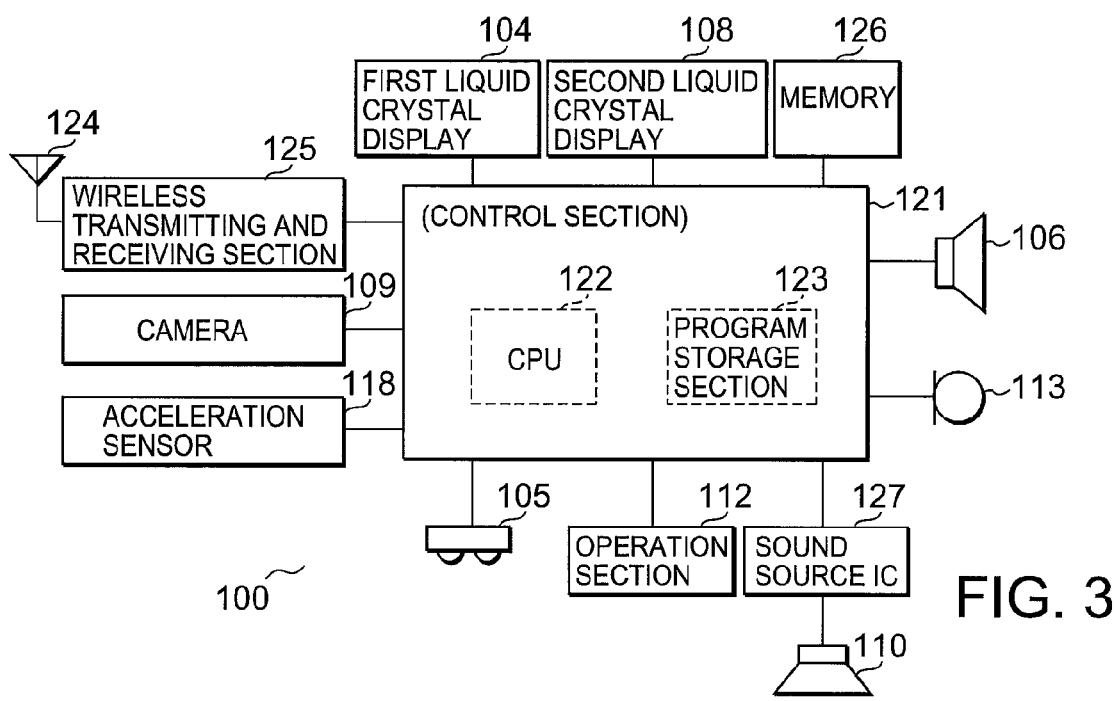
FIG. 3 is a block diagram showing an outline of a circuit configuration of the cellular phone according to the present embodiment.

FIG. 3 is a view showing an outline of a circuit configuration of this cellular phone. The cellular phone 100 is provided with a control section 121 made into a chip representative of a baseband LSI (Large Scale Integration). This control section 121 is internally provided with a CPU (Central Processing Unit) 122 and a program storage section 123 in which control programs for carrying out various kinds of control by this CPU 122 are stored. The program storage section 123 is also used as a work memory of the CPU 122. The control section 121 is connected to each section in the cellular phone 100.

Of these, a wireless transmitting and receiving section 125, to which an antenna 124 that carries out transmission and reception of radio signals is connected, is adapted to carry out modulation and demodulation of radio signals to be inputted and outputted. A memory 126 is a storage medium for storing various kinds of data, and can also be used as the program storage section 123 in the control section 121 depending on a device configuration. In this memory 126, for example, posture information of the cellular phone 100 outputted from the acceleration sensor 118 is adapted to be stored. Further, the speaker 110 is connected to the control section 121 via a sound source IC (Integrated Circuit) 127. The sound source IC 127 is an IC circuit that can make a lot of sounds at the same time, and can output various kinds of melodies and voice messages to the speaker 110 in accordance with sound source data supplied from the control section 121. In the present embodiment, during the period when infrared transmission is carried out by the infrared communication section 105, it is possible to output a melody expressing this as an image text.

The first liquid crystal display 104, each of the infrared communication section 105, the receiver 106, the second liquid crystal display 108, the camera 109, the operation section 112, the microphone 113 and the acceleration sensor 118 as have been explained in FIGS. 1 and 2 is connected to the control section 121. In addition to these, although they are not shown in the drawings, for example, a vibrator that vibrates when there is a call, and various indicators, arranged on the back surface or the like of the first or second enclosure 101, 102, for informing various states may be connected to the control section 121.

Figure 4:
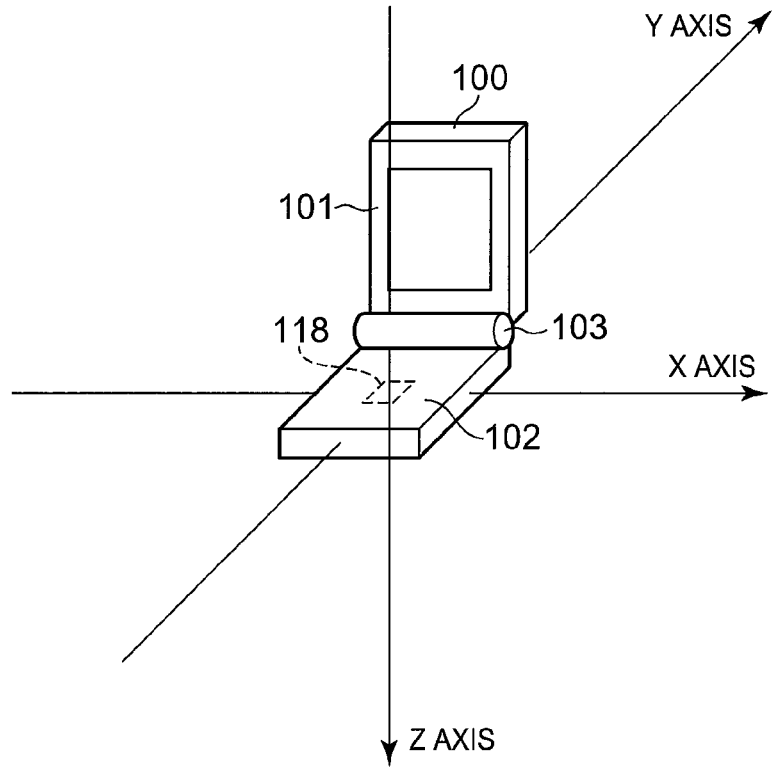
FIG. 4 is an explanatory drawing showing a method of measuring an angle of inclination of an acceleration sensor in the cellular phone according to the present embodiment.

FIG. 4 is a view for explaining a method of measuring an angle of inclination of the acceleration sensor in this cellular phone. The acceleration sensor 118 of the cellular phone 100 is positioned horizontally with respect to a surface of the second enclosure 102. At a home position that is a standard for posture control, a Z axis becomes a direction of force of gravitation perpendicular to a horizontal surface of the second enclosure 102. Further, an X axis of the acceleration sensor 118 becomes parallel to an axis direction of the hinge mechanism 103, and a Y axis becomes parallel to a longitudinal direction of the second enclosure 102. The acceleration sensor 118 of the present embodiment is adapted to be capable of detecting inclination of each of both a yaw (yaw) direction and a pitch (pitch) direction from 0° to 359°.

Figure 5:
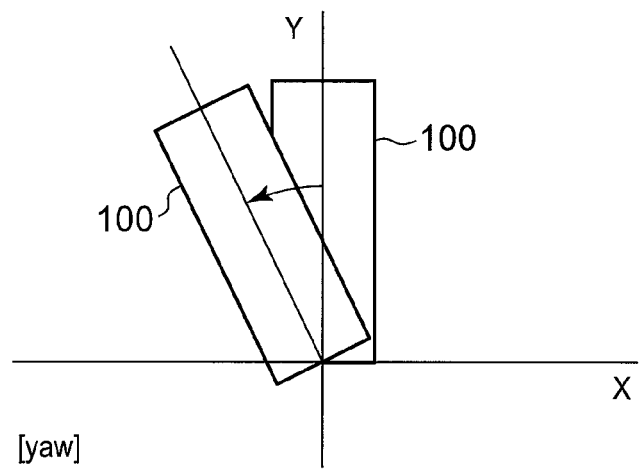
FIG. 5 is an explanatory drawing in which inclination or rotation of the cellular phone in a yaw direction is defined.

FIG. 5 is a view in which inclination or rotation of this cellular phone in the yaw direction is defined. The inclination or rotation in the yaw direction means that, when to be likened to an airplane, the airplane flying horizontally turns the nose of the airplane to a right or left direction. Thus, in the case of the airplane, clockwise turning or counter-clockwise turning is carried out. Therefore, an angle when the cellular phone 100 is rotated around a Z axis perpendicular to a paper in FIG. 4 on an X-Y plane becomes an inclination amount in the yaw direction.

Figure 6:
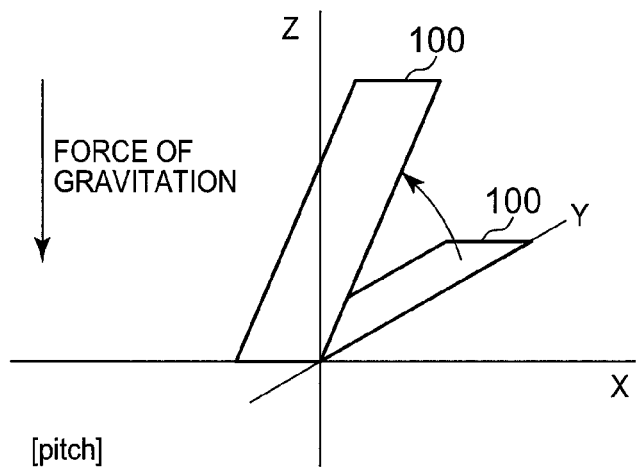
FIG. 6 is an explanatory drawing in which inclination or rotation of the cellular phone in a pitch direction is defined.

FIG. 6 is a view in which inclination or rotation of this cellular phone in the pitch direction is defined. The inclination or rotation in the pitch direction means that, when to be likened to an airplane, the nose of the airplane is turned to up or down direction while a wing is kept horizontally. Thus, in the case of the airplane, ascent or descent of altitude is carried out. Therefore, an angle when the cellular phone 100 is rotated around the X axis on a Y-Z plane becomes an inclination amount in the pitch direction.

Figure 7:
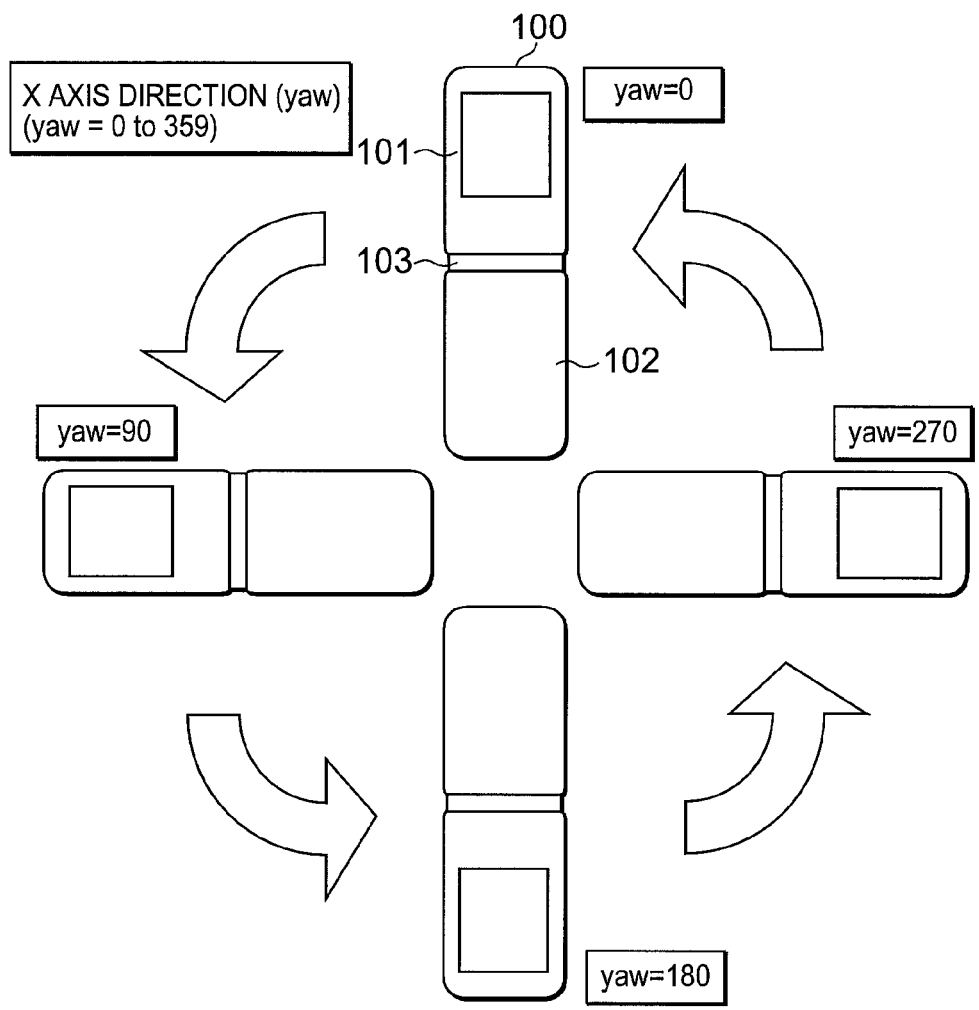
FIG. 7 is an explanatory drawing showing a posture of the cellular phone in the yaw direction when the cellular phone is rotated 90° by 90° from a reference angle according to the present embodiment.

FIG. 7 is a view showing a posture of the cellular phone in the yaw direction in the case of rotating the cellular phone from a reference angle 90° by 90°. The angle of 0° in the yaw direction means a state where the cellular phone 100 is caused to face in a direction in which a user goes forward and the second enclosure 102 is kept horizontally. When a wrist with the cellular phone 100 is rotated in a counterclockwise direction from this position by 90° to become edge-on to the left, it becomes a position in which the angle is 90° in the yaw direction. When the cellular phone 100 is turned to a reverse direction by further rotating the wrist in the counterclockwise direction by 90°, it becomes a position in which the angle is 180° in the yaw direction. Moreover, when the wrist with the cellular phone 100 is rotated by 90° to edge-on direction to the right, it becomes a position in which the angle is 270° in the yaw direction.

In the present embodiment, an angle to detect start of transfer of data is set to the range of 100° to 280° in the yaw direction. Since it is usually carried out that an arm is swung to right and left in a state where the cellular phone 100 is held, occurrence of a false operation is prevented by causing data transfer not to be started at a posture of the cellular phone 100 that may be carried out usually. Of course, for example, when it is assumed the case of carrying out infrared communication, a cellular phone (not shown in the drawings) that becomes a target of data transfer exists right near the user, and parties of the data transfer have discussed transferring data from now. In such a situation, it is possible to assume that a user does not usually carry out an operation by which a false operation occurs. Therefore, it is possible to set the angle for detecting start of the transfer of the data to the wider range (for example, 50° to 310°).

Figure 8:
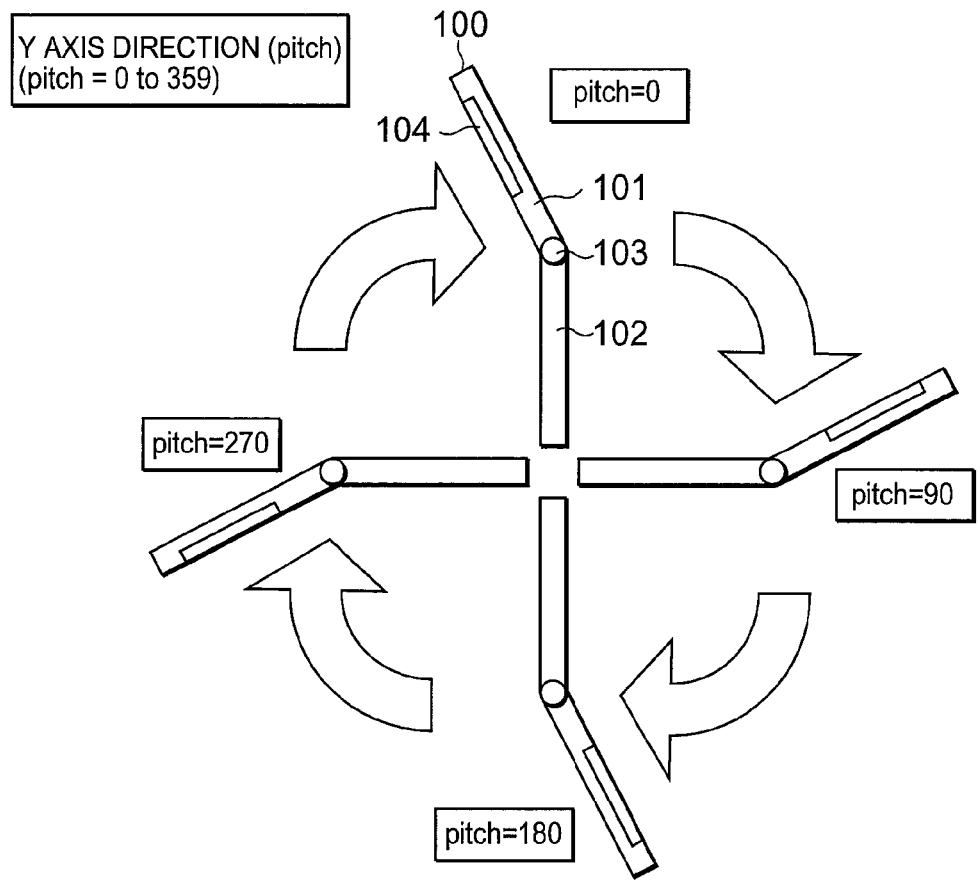
FIG. 8 is an explanatory drawing showing a posture of the cellular phone in the pitch direction when the cellular phone is rotated 90° by 90° from a reference angle according to the present embodiment.

FIG. 8 is a view showing the posture of the cellular phone in the pitch direction in the case of rotating the cellular phone from a reference angle 90° by 90°. The angle of 0° in the pitch direction means a state where the cellular phone 100 is cased to face the front of a face of the user and the second enclosure 102 is kept perpendicularly. When the second enclosure 102 becomes a horizontal direction by putting an upper end side of the cellular phone 100 down from this position in a direction away from the face, the angle in the pitch direction becomes a position of 90°. When it becomes arrangement upside down by further putting the upper end side of the cellular phone 100 down from this state, the angle in the pitch direction becomes a position of 180°. When the second enclosure 102 becomes the horizontal direction at the state where the first enclosure 101 approaches the face of the user by further rotating it in the same direction, the angle in the pitch direction becomes a position of 270°.

In the present embodiment, an angle to detect start of transfer of data is set to the overall range of 100° or more (100° to 359°) in the pitch direction. This is because, in relation to viewing the first liquid crystal display 104 of the first enclosure 101, it is usually carried out that the hinge mechanism 103 side of the second enclosure 102 of the cellular phone 100 is inclined in a direction away from the face using the perpendicular direction as a base point, but it is not usually carried out that it is inclined in a reverse direction to this. Of course, it is free to change the angle range into one other than this in the similar manner to that explained about the yaw direction with reference to FIG. 7.

Figure 9:
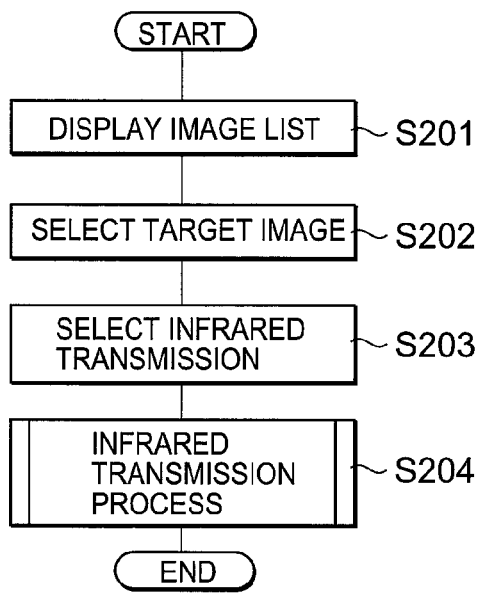
FIG. 9 is a flowchart showing an overview of a process for transmitting a desired image of ones stored in the cellular phone with infrared rays according to the present embodiment.

FIG. 9 is a flowchart showing an overview of a process to transmit desired one from images stored in the cellular phone with infrared rays, for example. It will be described together with FIG. 3. The case where desired one from a plurality of images that a user of the cellular phone 100 shot by means of the camera 109 and stored in the memory 126 is to be transmitted to a cellular phone (not shown in the drawings) of other user with infrared communication will be described as an example.

The user first causes the first liquid crystal display to display a list of images that have been shot in the past by carrying out a predetermined operation from a menu screen of the cellular phone 101 or pushing a special function key of the operation section 112 (Step S201). This display may be one in which a thumbnail image is displayed in a list format, or one in which an image title and a shooting date of each of them are displayed as text information. The user selects desired one from a plurality of images that have already been shot (Step S202). This selection is carried out by a known key operation of the pointer 115 of the operation section 112, the dial key 116 and the like shown in FIG. 1. In this case, a portion where the selected image or text is displayed is displayed with a color or brightness different from that of other place or in a display format of reversed lightness. Therefore, even if a wrong image is being selected, selection of the desired image is carried out by continuing the key operation.

Next, the user selects "infrared transmission" from methods of processing images (Step S203). A method of transferring an image may first be selected, and after this, selection of data to be transferred may be carried out. Further, when only the "infrared transmission" is present as a kind of data transfer, the selecting process at Step S203 becomes unnecessary. When the processes described above are completed, an infrared transmission process for the selected image is carried out at the time when preparation of communication of the other side is terminated (Step S204).

Figure 10:
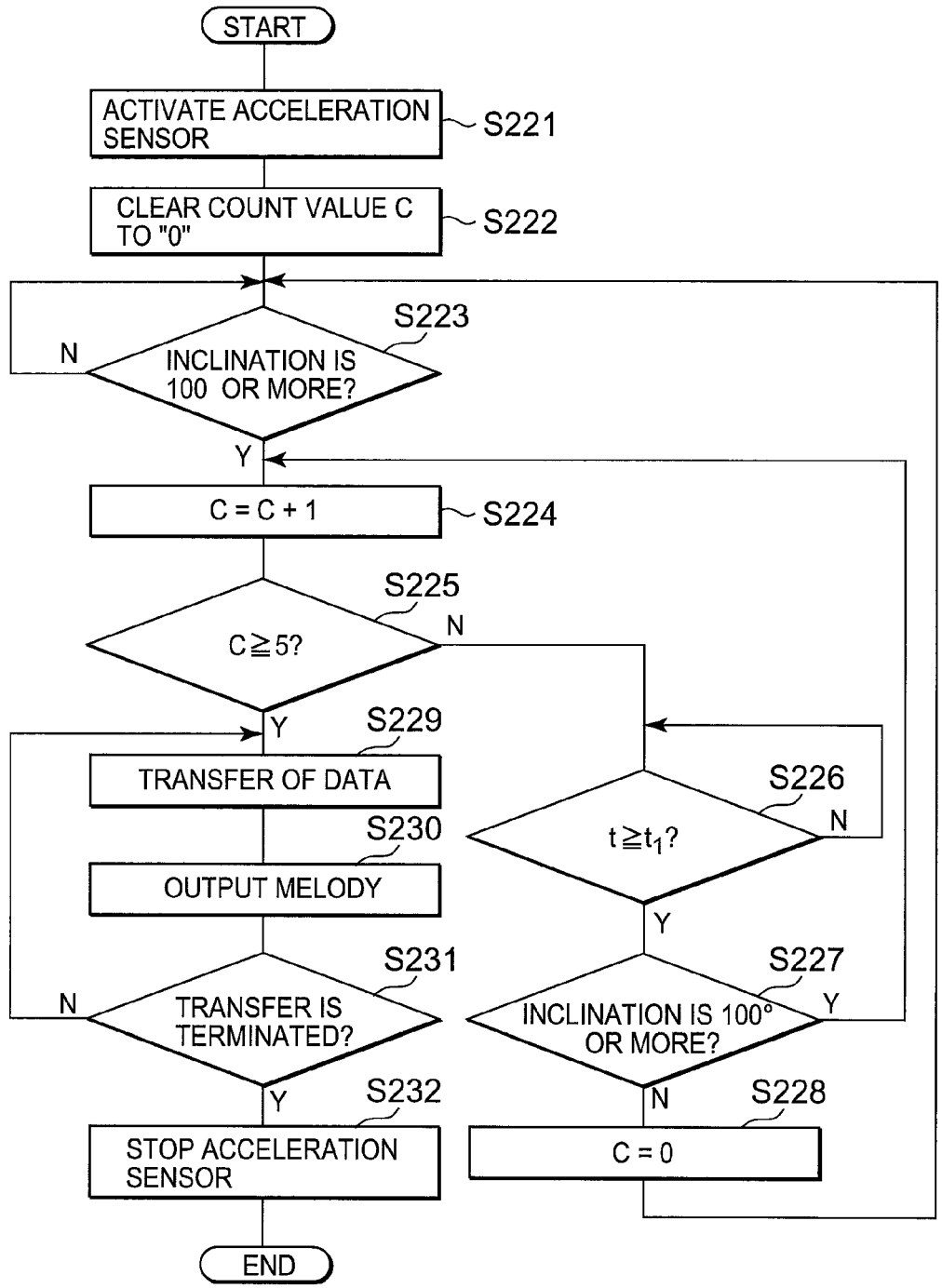
FIG. 10 is a flowchart specifically showing an infrared transmission process according to the present embodiment.

FIG. 10 is a view specifically showing an infrared transmission process according to the present embodiment. It will be described together with FIG. 3.

When the user selects the "infrared transmission" at Step S203 in FIG. 9, the acceleration sensor 118 is first activated (Step S221), and the control section 121 clears a count value C stored in a count area as a predetermined area of the memory 126 to "0" (Step S222). In the present embodiment, in order to prevent a false operation, it is set, as a condition to start transmission, that the count value is a value or more continuously, and for this reason, a counter by software is used. Here, the count value is cleared to "0" for initial setting.

After this, the control section 121 starts to detect a yaw angle and a pitch angle outputted by the acceleration sensor 118. The detection of these yaw angle and pitch angle is carried out at intervals of 0.1 seconds, for example, and determination of the respective angles is carried out. Transfer of the data by infrared rays, which is an image in which the user inclines a glass to pass the water to the other, is not started until any of the yaw angle and the pitch angle exceeds 100°, and a standby state is kept (Step S223: N).

When the yaw angle increases over 100° and not more than 280°, or when the pitch angle becomes 100° or more (Step S223: Y), the control section 121 increments the count value by "1" (Step S224). In the case of first time, it increases to "1" because the count value was "0". When the process at Step S224 is carried out, determination of whether or not the count value becomes "5" or more is carried out (Step S225). In the case where the count value does not reach "5" yet (N), it stands by only for time t1 (Step S226). In the present embodiment, the time t1 is 0.1 seconds.

When 0.1 seconds elapses (Step S226:Y), determination of whether or not the yaw angle increases over 100° and not more than 280° or whether or not the pitch angle becomes 100° or more is carried out at the timing (Step S227). In the case where the yaw angle increases over 100° and not more than 280° or the pitch angle is 100° or more at this point in time (Y), it proceeds to Step S224 and the count value is again incremented by "1".

Now, for example, in the case where the user carelessly inclines the cellular phone 100 temporarily, the user often notices the wrong operation until the count value increases up to "5", and returns to an original posture state. In the case where the posture of the cellular phone 100 is returned to the original posture in such a situation, both the yaw angle and the pitch angle become less than 100°. In the case where such a situation occurs (Step S227: N), the count value C is cleared to "0" (Step S228), and it returns to the process at Step S223. Namely, the process stands by until the user again inclines the cellular phone 100 for infrared transmission. By adopting measures against a wrong operation in this manner, data are prevented from being transferred accidentally, and this brings no discomfort to the user.

On the other hand, in the case where it is determined at Step S227 that the yaw angle continuously becomes over 100° and not more than 280° or the pitch angle becomes 100° or more, as a result of the fact that increase of the count value is continuously carried out, the count value becomes "5" or more at some point in time (Step S225: Y). Thus, in the present embodiment, when the cellular phone 100 continuously keeps a predetermined inclination state for 0.5 seconds or more, transfer of data by infrared rays is carried out (Step S229). In this example, transmission of the selected image by infrared rays is started.

When the transfer of the data is started in this manner, the control section 121 controls the sound source IC 127 to output a sound when the water is poured from a glass, for example, as a melody from the speaker 110 (Step S230). Since the user can also start infrared communication by inclining the cellular phone 100 so as to pour the data into a device of the party, it is possible to carry out the operation instinctively. In addition, the operation is simpler than the key operation of the operation section 112 by practice.

The processes at Step S229 and Step S230 described above are continued while transfer of the data selected by the user is carried out (Step S231: N, Step S229, and Step S230). The user starts the communication by infrared rays by inclining the cellular phone 100. For that reason, even though a state where the infrared communication is carried out is displayed as visible information on the first liquid crystal display 104 or the second liquid crystal display 108 at a point to start the transfer, the user does not often view this. Further, it is often hard to view display content depending on the angle of inclination of the cellular phone 100. However, in the present embodiment, when transfer of data by infrared rays is started, a specific melody is played from the speaker 110 until this is terminated. Therefore, it is possible to intuitively know that the communication is normally continued without the need to view the display of the first liquid crystal display 104 or the second liquid crystal display 108.

When the communication by the infrared rays is terminated (Step S231: Y), the control section 121 stops a check on the output of the acceleration sensor 118 at the time (Step S232). Further, since the output of the melody at Step S230 is stopped at this point in time, the user can know that the infrared communication is terminated. Of course, the cellular phone 100 can continue communication by returning to a normal posture after this is inclined to start communication by infrared rays. Therefore, when a state of the infrared communication is displayed on the first liquid crystal display 104 or the second liquid crystal display 108 as visual information, the user can grasp the transfer state by viewing this.

Although the case where the infrared communication is carried out has been described in the embodiment described above, the case where normal wireless communication of e-mail via a base station is carried out, and the case where transfer of data is carried out by connecting to a wireless LAN (Local Area Network) or transmitted and received with a radio technology such as Bluetooth (Bluetooth) may also be carried out by changing the posture of the cellular phone similarly.

Further, although the flip cellular phone has been explained in the embodiment, the present invention can be applied to an all-in-one cellular phone in which the respective parts are integrated into one enclosure similarly. Moreover, the mobile terminal device of the present invention is not limited to the cellular phone. It goes without saying that the present invention can be applied to other devices such as a PHS, a PDA and a toy communication device so long as it is a portable terminal device provided with a display and postural change detecting means.

Moreover, although the output of the sound has been stopped at the time when the infrared communication is terminated in the embodiment, it is not limited to this. Further, there is no need to continuously output a melody from the speaker 110 even in the case where a transfer error occurs during data transfer. Modified examples of the present invention will next be described with respect to these.

FIRST MODIFIED EXAMPLE

Figure 11:
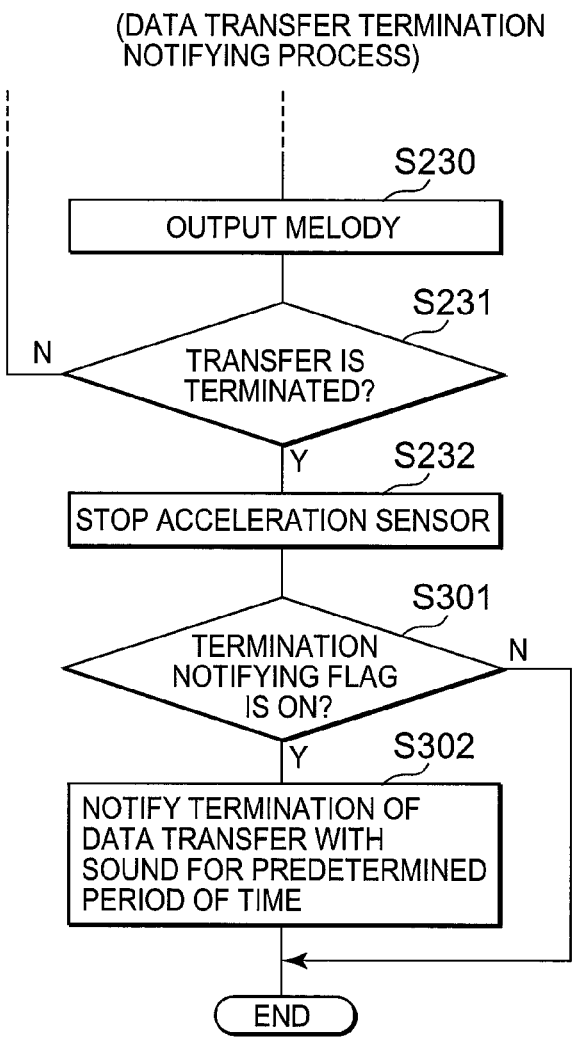
FIG. 11 is a flowchart showing a data transfer termination notifying process as a first modified example of the present invention.

FIG. 11 is a view showing a flowchart in which a part of the flowchart shown in FIG. 10 is changed as a first modified example of the present invention. Only a part of the same part as FIG. 10 is shown, and the explanation of a common part of FIG. 10 will be omitted arbitrarily. It will be described together with FIG. 3.

In this first modified example, when transfer of data is terminated successfully (Step S231: Y), the process of the acceleration sensor 118 is stopped (Step S232). Since this causes breakaway from a loop of the transfer process of data, a melody such as a sound of water indicating that it is during data transfer or a voice of "during data transfer" is stopped to be outputted from the speaker 110.

The control section 121 checks whether or not a "termination notifying flag" in a predetermined area of the memory 126 becomes ON at this point in time (Step S301). Here, the "termination notifying flag" is a flag indicating whether or not, when transfer of data is terminated, its notification is informed with a sound. The user is allowed to set ON or OFF and a melody or a voice at ON in advance. In this modified example, a default value becomes OFF.

In the case where the "termination notifying flag" becomes OFF (Step S301: N), the processing is terminated directly (END). Namely, the user can know that the transfer of the data is terminated at the point in time when the output of the melody at Step S230 is stopped.

On the other hand, in the case where the "termination notifying flag" becomes ON (Step S301: Y), the control section 121 transmits data for control set in advance to the sound source IC 127 to cause it to output a melody or sound specified by the data from the speaker 110 for a predetermined period of time (Step S302). This melody or sound naturally differs from one outputted from the speaker 110 at Step S230. Therefore, the user can know that the transfer of the data is terminated without the need to view the content of the first liquid crystal display 104 or the second liquid crystal display 108. Vibration may be generated for a given period of time by means of a vibrator (not shown in the drawings) depending on setting contents.

SECOND MODIFIED EXAMPLE

Figure 12:
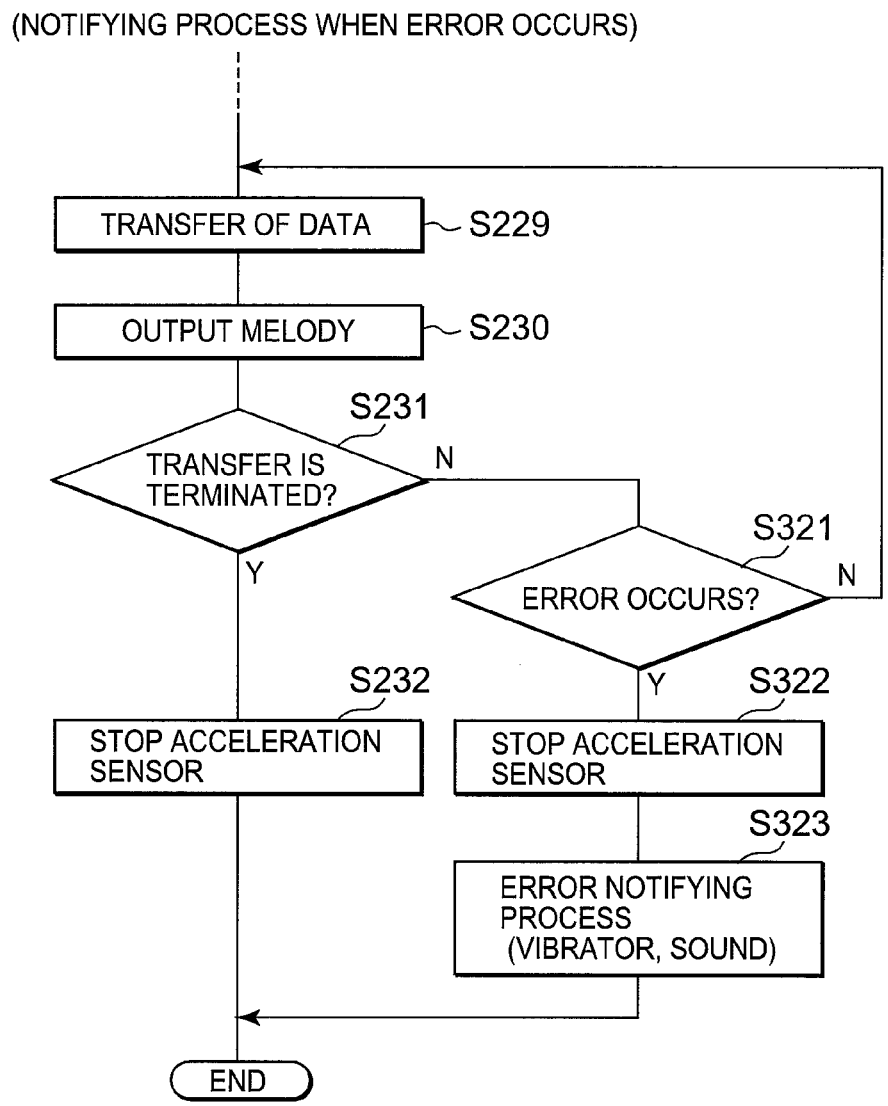
FIG. 12 is a flowchart showing a notifying process when an error occurs as a second modified example of the present invention.

FIG. 12 is a view showing a flowchart in which a part of the flowchart shown in FIG. 10 is changed as a second modified example of the present invention. Only a part of the same part as FIG. 10 is shown, and the explanation of a common part of FIG. 10 will be omitted arbitrarily. It will be described together with FIG. 3.

Even when an error occurs in the middle of the data transfer, the user does not often view the content of the first liquid crystal display 104 or the second liquid crystal display 108, and thus, it may take much time to notice it. This point is improved in a second modified example. The control section 121 carries out a check on whether transfer of data is completely terminated or not (Step S231) and a check on presence or absence of error occurrence (Step S321) whenever the data are transferred by a predetermined unit. When the transfer of the data is terminated (Step S231: Y), it is the same as the previous embodiment in that the process using the acceleration sensor 118 is terminated (Step S232).

In the case where an error occurs in the middle of the transfer of the data (Step S321: Y), the process using the acceleration sensor 118 is terminated (Step S322), and the control section 121 subsequently carries out an error notifying process (Step S323). This process may be carried out by vibration of the vibrator, or may be one in which it is notified that an error occurs by a melody for perceiving an alarm or a sound "an error has occurred".

This application is based upon and claims the benefit of priority from Japanese patent application No. 2006-203633, filed Jul. 26, 2006, the disclosure of which is incorporated herein in its entirety by reference.

The invention claimed is:

1. A mobile terminal device comprising: postural change detecting means for detecting specific changes on a posture of an apparatus body, the specific changes comprising at least rotation of the apparatus body in yaw and pitch directions;
the postural change detecting means comprises a sampling means for sampling, after the data to be transferred are selected in the transferred data selecting process, angles by which a posture of an apparatus body is displaced from a reference position from outputs of acceleration sensors fixed in the apparatus body every predetermined period of time, the acceleration sensors comprising acceleration sensors for detecting rotations of the apparatus body in yaw and pitch directions;
a display for displaying visual information;
transferred data candidate display means for displaying candidates of data to be transferred on the display;
transferred data selecting means for selecting data to be transferred from the candidates displayed by the transferred data candidate display means,
wherein the transfer of data comprises transmitting the selected data to a receiving mobile device via a radio channel; and
data transfer starting means for starting transfer of the data when the postural change detecting means detects any of the specific changes in a state where the data to be transferred are selected by the transferred data selecting means, the data transfer starting means further comprising notification sound outputting means for outputting sound of flowing water as a notification sound for notifying a predetermined data transfer state while the data are transferred,
wherein: the postural change detecting means detects the specific change when the apparatus body is rotated on a plane in a range of angle while the display displays visual information regardless of the posture; the range comprises a first posture that the apparatus body is rotated on the plane by 180 degrees from a second posture that a user operates the mobile terminal device with seeing the display, and information displayed on the display is out of sight of the user when the apparatus body has the first posture.

2. The mobile terminal device as claimed in claim 1, wherein the data transfer starting means includes notification sound outputting means for outputting a notification sound for notifying a predetermined data transfer state when the transfer of the data is started.

3. The mobile terminal device as claimed in claim 2, further comprising:
data transfer termination detecting means for detecting termination of the transfer of the data,
wherein the notification sound outputting means outputs the notification sound until the data transfer termination detecting means detects the termination of the transfer of the data.

4. The mobile terminal device as claimed in claim 3, wherein the notification sound outputting means outputs a completion notification sound for notifying transfer completion of the data when the data transfer termination detecting means detects the termination of the transfer of the data.

5. The mobile terminal device as claimed in claim 1, further comprising:
transfer state data outputting means for outputting transfer state data for causing the display to display a state of the data transfer while the data transfer starting means carries out the transfer of the data.

6. The mobile terminal device as claimed in claim 1, wherein the postural change detecting means detects a specific change when the posture is rotated in a range of a specific angle or more and not more than other specific angle from a predetermined home position.

7. The mobile terminal device as claimed in claim 1, wherein the postural change detecting means includes:
change presence/absence determining means for determining presence or absence of the specific change with a plurality of intervals of time;
count means for increasing a count value whenever the change presence/absence determining means detects presence of the change and for resetting the count value at the time when absence of the change is detected; and
detection determining means for determining that the specific change is detected when the count means counts a positive value more than one.

8. A non-transitory medium storing a data transfer control program for causing a processor of a mobile device to execute:
a transferred data selecting process for selecting data to be transferred to a receiving mobile device via a radio channel;
a sampling process for sampling, after the data to be transferred are selected in the transferred data selecting process, angles by which a posture of an apparatus body is displaced from a reference position from outputs of acceleration sensors fixed in the apparatus body every predetermined period of time, the acceleration sensors comprising acceleration sensors for detecting rotations of the apparatus body in yaw and pitch directions;
a specific angle range continuously detecting process for detecting this when the angle in yaw direction enters a specific angle range in yaw direction more than once by the sampling process or when the angle in pitch direction enters a specific angle range in pitch direction more than once by the sampling process;
a data transfer starting process for starting transfer of the data selected in the transferred data selecting process when it is detected that each of the angles continuously enters the specific angle range more than once in the specific angle range continuously detecting process; and
a notification sound outputting process for outputting sound of flowing water as a notification sound until the transfer of the data is terminated when the transfer of the data is started in the data transfer starting process, the notification sound indicating that the transfer of the data is being carried out,
wherein: the postural change detecting means detects the specific change when the apparatus body is rotated on a plane in a range of angle while the display displays visual information regardless of the posture; the range comprises a first posture that the apparatus body is rotated on the plane by 180 degrees from a second posture that a user operates the mobile terminal device with seeing the display, and information displayed on the display is out of sight of the user when the apparatus body has the first posture.

9. The non-transitory medium as claimed in claim 8, wherein the postural change detecting means includes:
change presence/absence determining means for determining presence or absence of the specific change with a plurality of intervals of time;
count means for increasing a count value whenever the change presence/absence
determining means detects presence of the change and for resetting the count value at the time when absence of the change is detected; and
detection determining means for determining that the specific change is detected when the count means counts a positive value more than one.

* * * * *